2,977,479
DETECTOR FOR CARBONIFEROUS GAS

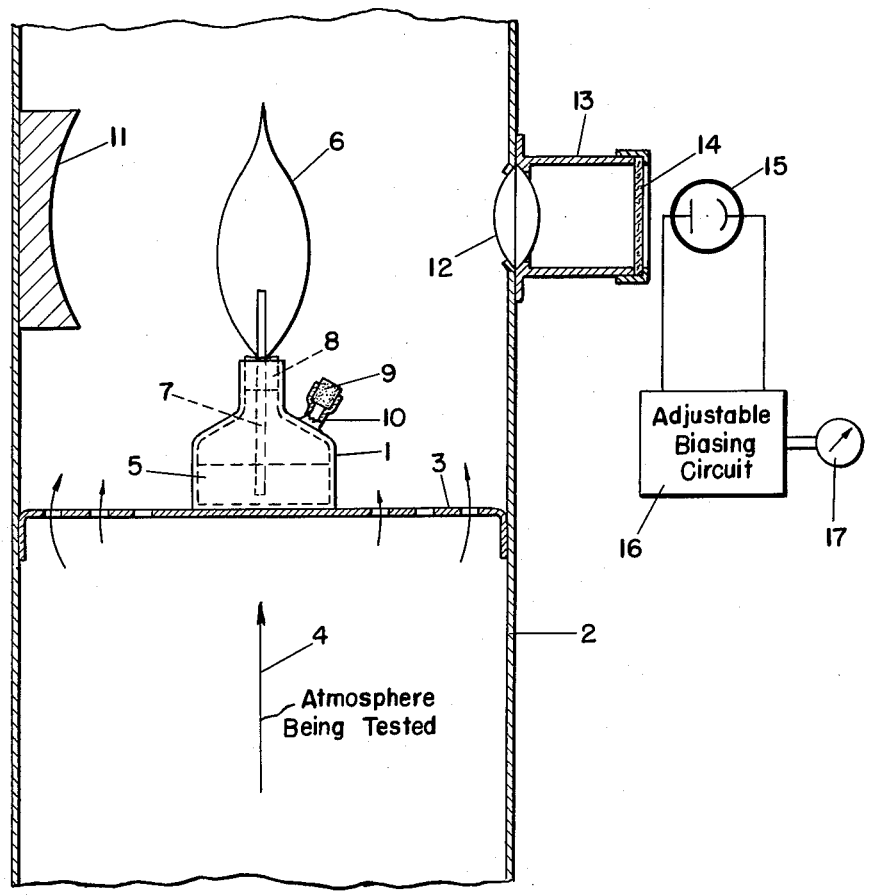

James L. Lauer, Philadelphia, Pa., assignor to Sun Oil Company, Philadelphia, Pa., a corporation of New Jersey Filed May 20, 1959, Ser. No. 814,539

7 Claims. (Cl. 250—218)

This invention relates to a detector for carboniferous gas, and more particularly to a device operating to detect traces of carboniferous (carbon-containing) gas in an oxygen-containing atmosphere. As used herein, the terms "carboniferous gas" or "carboniferous gases" refer to any gas or gases the molecules of which contain one or more carbon atoms. By way of example, a carboniferous gas may be a gaseous hydrocarbon, or it may be a gas such as carbon monoxide which is not a hydrocarbon.

It is known that the color of a hydrogen/air flame is greatly affected by the presence of small amounts (traces) of carboniferous gas, which small amounts may be thought of as impurities in the oxygen-containing atmosphere. This principle has previously been utilized in designing a detector for chromatographic analysis of mixtures of carboniferous gases. When using a detector of this type, the effluent from the chromatographic column (comprising carrier gas plus time-spaced individual components of the gaseous mixture being analyzed) is applied to the hydrogen flame, and changes in the flame color (produced when each respective carboniferous gas component of the mixture reaches the flame) are observed or detected.

The hydrogen flame detector described requires, for its operation, a supply of compressed hydrogen gas, such a gas supply being ordinarily contained in cylinders. It should be apparent that such a detector, requiring as it does cylinders of compressed gas (which latter are heavy and bulky, especially if any sizeable gas volume is needed), is at best inconvenient, and this is particularly the case for small portable flame detectors. Such portable detectors would be useful for detecting firedamp (methane gas) in coal mines, for detecting hydrocarbon gases in refinery areas (e.g. around an ammonia plant), etc. It may be stated that although the principal use of such a detector may perhaps be for detecting traces of hydrocarbon gases, the detector would not be limited in use thereto, but would be useful for detecting traces of other (non-hydrocarbon) carboniferous gases.

An object of this invention is to provide a novel detector for carboniferous gases.

Another object is to provide a flame detector for carboniferous gases which does not require cylinders of compressed gas for fuel.

A further object is to provide a flame detector which utilizes a liquid for fuel.

A still further object is to provide a carboniferous-gas detector which is small and of light weight, and therefore is highly portable.

The objects of this invention are accomplished, briefly, in the following manner: a combustible inorganic liquid, e.g. pentaborane, is burned in the oxygen-containing atmosphere which is to be tested for traces of carboniferous gas. When the slightest trace of a carboniferous or carbon-containing gas is present, the color of the flame changes from normal, and this color change from normal is sensed by a photocell detector, giving an indication on a suitable meter which is connected to the photocell output. By employing a suitable calibration, the meter reading may be made proportional to the concentration of the carboniferous gas present.

A detailed description of the invention follows, taken in conjunction with the accompanying drawing, wherein the single figure is a diagrammatic illustration of a detector according to this invention.

Referring now to the drawing, a vessel 1 is mounted within an open-ended housing 2 which may be of hollow cylindrical cross-section. The support 3, which mounts and secures vessel 1 in an upright position substantially axially of housing 2, must be so constructed as to allow gas to flow freely in an upward direction in housing 2, around vessel 1. For example, support 3 may be of webbed construction, or it may comprise a perforated plate, as illustrated.

The lower end of housing 2 is coupled to the oxygen-containing atmosphere being tested, so that the gas or mixture of gases comprising such atmosphere flows upwardly along the length of housing 2 in the direction of arrow 4, as indicated. If the detector of the invention were being utilized as a detector in gas chromatography, the "out" side of the chromatographic column would be connected directly to the lower end of housing 2, so that in this case the atmosphere being tested would be the effluent gas from the chromatographic column. On the other hand, if the detector of the invention were being utilized as a small portable detector (to test, for example, the atmosphere in a coal mine or the atmosphere around an ammonia plant), then the lower end of housing 2 would simply be open to or exposed to such atmosphere.

The vessel 1 contains a combustible inorganic liquid 5 which is adapted to be burned in the atmosphere being tested. For this purpose, the atmosphere must contain sufficient oxygen to support combustion. The liquid 5 may desirably be pentaborane, which is a boron hydride compound having the chemical composition $B_5H_9$. Pentaborane has a boiling point of 48° C. (119° F.) and a melting point of −46.6° C. (−52° F.), so is a liquid at ordinary temperatures. Pentaborane burns with an exceedingly high flame velocity, though its flame velocity is slower than that of hydrogen. Pentaborane has a specific gravity of only 0.61, so it is not inordinately or unduly heavy.

In order to burn the liquid 5 so as to produce a flame 6, a suitable porous wick 7 extends down into the vessel 1 from a point outside the same, the lower end of the wick 7 contacting the liquid 5. Wick 7 should be made of an inorganic material, such as glass wool, to avoid any possible ambiguities in the detecting operation. Suitable ignition applied to the upper end of wick 7 causes the liquid 5 to burn, producing a flame 6. This flame is directly exposed to the atmosphere being tested, which atmosphere flows upwardly in the direction 4 and completely surrounds the vessel 1.

Since moisture causes the decomposition of pentaborane, proper precautions should be taken to prevent any moisture from reaching the liquid 5 in vessel 1. Such precautions might include the provision of a drying or moisture-absorbing material 8 around wick 7, and the utilization of similar material at 9 in the vessel fill pipe 10.

Mounted on the inner wall of housing 2, near the upper end thereof, is a reflecting mirror 11. This mirror is positioned to receive light from the flame 6 and to reflect such light toward a lens 12 which is mounted in an aperture in the wall of housing 2, at a point diametrically opposite to mirror 11. The combination of the reflecting and focusing mirror 11 and the focusing lens 12 acts to gather a maximum amount of the light emitted by flame 6 and to direct it into a light-transmitting tube 13 which is axially aligned with lens 12 and which extends outwardly away from housing 2, in a direction at right angles to the axis of the housing.

Mounted axially in tube 13, at a point spaced from lens 12, is an optical filter 14, which is designed to transmit light of only a very narrow band of wavelengths, and to stop light of all other wavelengths.

The color of a pentaborane flame is extremely sensitive to traces of carboniferous gas. To state that the color of the flame changes under thees conditions is equivalent to stating that the wavelength of the produced light changes. The presence of carboniferous gas in the atmosphere being tested results in light of a predetermined wavelength being produced by flame 6. The filter 14 is constructed and arranged to transmit light of substantially only this predetermined wavelength, and does not transmit light of the "normal" color or "normal" wavelength associated with flame 6. Optical filters which will perform the function of transmitting only a very narrow band of wavelengths of light, centered at a predetermined wavelength, and preventing the transmission of light of all other wavelengths, are so well known that further description thereof is unnecessary. Examples of the produced predetermined wavelengths for carboniferous gases are: 5165 and 4737 angstroms (Swan bands due to $C_2$) and 4315 angstroms (due to CH). These are the outstanding wavelengths emitted in flames of the carboniferous gases just referred to.

A photocell 15, preferably of the vacuum type, is positioned to receive light transmitted through filter 14. This photocell is connected to an adjustable biasing circuit 16, which latter includes an adjustable bias battery for the purpose of biasing out the background light or ambient light which is effective on phtoocell 15. The output of photocell 15 is connected to a suitable meter 17 provided with a scale. Essentially, meter 17 will indicate changes in photocurrent, with respect to background. By appropriate choice of the various constants, the reading of this meter may be made directly proportional to the amount of light of a predetermined wavelength (the particular wavelength transmitted by filter 14) falling on photocell 15, and thus directly proportional to the concentration of carboniferous gas in the atmosphere being tested.

The detector of this invention is extremely sensitive, and is capable of producing an indication in response to a concentration of carboniferous gas of less than one part per million.

It is desired to be pointed out that the detector of this invention, using as it does a combustible liquid (rather than a combustible gas) for producing the sensitive flame, does not require the use of any cylinders, and therefore can be made in the form of a very small, portable apparatus.

Although the foregoing description has referred to a change in the color of the (pentaborane) flame from normal due to the presence of carboniferous gas, this phenomenon may be expressed in another way. It may be stated that the flame temperature of pentaborane is sensitive to carboniferous gas, and the temperature of the pentaborane flame changes from normal in response to a trace of carboniferous gas in the atmosphere being tested, i.e. in the atmosphere wherein the (liquid) pentaborane is burning.

The invention claimed is:

1. A device for detecting traces of carboniferous gas in an oxygen-containing atmosphere, comprising a vessel containing a combustible inorganic liquid, means for burning said liquid in said atmosphere to produce a flame, the color of said flame changing from normal due to the presence of carboniferous gas in said atmosphere, a photocell detector positioned to receive light from said flame, and an optical filter between said flame and said photocell for transmitting to said photocell substantially only flame-produced light of said changed color.

2. A detecting device in accordance with claim 1, wherein said liquid is pentaborane.

3. A detecting device in accordance with claim 1, wherein said means for burning includes a porous wick made of an inorganic material, said wick being so mounted in said vessel that one end thereof contacts said liquid.

4. A detecting device in accordance with claim 1, wherein said liquid is pentaborane, and wherein said means for burning includes a porous wick made of an inorganic material, said wick being so mounted in said vessel that one end thereof contacts said liquid.

5. A device for detecting traces of carboniferous gas in an oxygen-containing atmosphere, comprising a vessel containing liquid pentaborane, means for burning said liquid pentaborane in said atmosphere to produce a flame, the color of said flame changing from normal due to the presence of carboniferousg as in said atmosphere, and means responsive to a change from normal in the color of said flame for producing an indication.

6. A device for detecting traces of carboniferous gas in an oxygen-containing atmosphere, comprising a vessel containing liquid pentaborane, means for burning said liquid pentaborane in said atmosphere to produce a flame, the color of said flame changing from normal due to the presence of carboniferous gas in said atmosphere, and a photocell detector positioned to receive light from said flame.

7. A device for detecting traces of carboniferous gas in an oxygen-containing atmosphere, comprising a vessel containing liquid pentaborane, means for burning said liquid pentaborane in said atmosphere to produce a flame, the color of said flame changing from normal due to the presence of carboniferous gas in said atmosphere, a photocell detector positioned to receive light from said flame, and means positioned between said flame and said photocell detector for causing said photocell detector to respond only to a change from normal in the color of said flame.

References Cited in the file of this patent
UNITED STATES PATENTS

| | | |
|---|---|---|
| 892,241 | Freise | June 30, 1908 |
| 2,664,779 | White | Jan. 5, 1954 |